Sept. 28, 1954   A. L. DITTMAN ET AL   2,690,459
MANUFACTURE OF COMPOUNDS CONTAINING FLUORINE
Filed Oct. 9, 1948
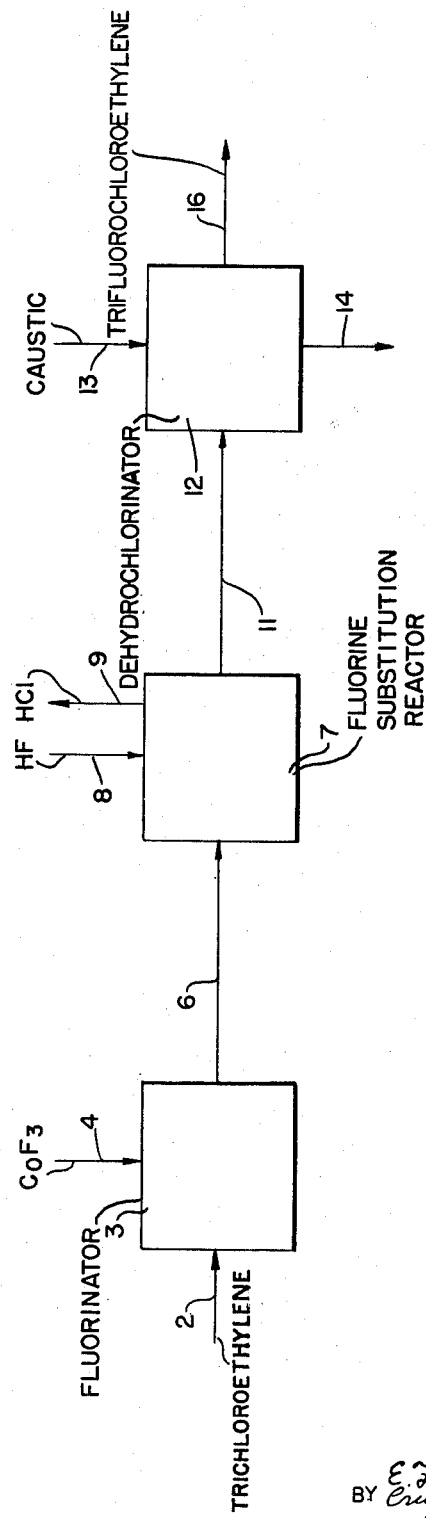
INVENTORS.
ALBERT L. DITTMAN
JOHN M. WRIGHTSON
BY E. F. Liebrecht
Cruzan Alexander
ATTORNEYS Patented Sept. 28, 1954

2,690,459

UNITED STATES PATENT OFFICE 2,690,459

MANUFACTURE OF COMPOUNDS CONTAINING FLUORINE

Albert L. Dittman, Jersey City, and John M. Wrightson, North Bergen, N. J., assignors to The M. W. Kellogg Company, Jersey City, N. J., a corporation of Delaware Application October 9, 1948, Serial No. 53,723

11 Claims. (Cl. 260—653)

This invention relates to a method for the manufacture of carbon compounds containing fluorine. In one aspect this invention relates to the manufacture of perhaloolefins containing fluorine from olefins containing chlorine. In a more particular aspect this invention relates to the method of producing trifluorochloroethylene from trichloroethylene. In still a further aspect the invention relates to the manufacture of a monomer useful for polymerization to solid and liquid polymers having good physical and chemical characteristics.

Trifluorochloroethylene and similar fluorine containing perhaloolefins are useful as intermediate reactants for various chemical processes. In particular, trifluorochloroethylene may be polymerized under appropriate conditions to produce normally liquid and normally solid polymers useful for various purposes because of their chemical inertness and excellent physical properties.

The object of this invention is to provide a novel method for preparing olefins containing fluorine.

Another object of this invention is to provide an improved method for the production of trifluorochloroethylene which may be used directly as the monomer for producing polytrifluorochloroethylene polymers.

Various other objects and advantages of the present invention will become apparent to those skilled in the art from the accompanying description and disclosure.

According to this invention, we have found that olefins containing at least three fluorine atoms may be prepared directly from olefins containing at least two chlorine atoms. One such preparation comprises fluorinating trichloroethylene with a fluorinating agent, such as cobalt, nickel or manganese fluorides, to produce the corresponding paraffin containing fluorine. The paraffin thus produced containing fluorine and chlorine is subjected to a substitution reaction with hydrogen fluoride to replace one chlorine atom with a fluorine atom in the presence of a suitable catalyst, such as antimony, titanium or tin salt. The product of this second reaction, which is a paraffin of greater fluorine content, is then treated with caustic to remove another chlorine atom and to produce the corresponding olefin, trifluorochloroethylene.

The following equations illustrate the preferred reactions employed in converting trichloroethylene to trifluorochloroethylene.

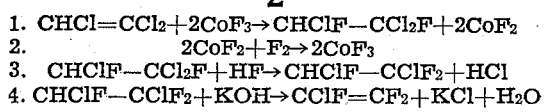

The fluorination of a trichloroethylene with a cobalt fluoride, as illustrated by Equation 1, is effected at a temperature between about 0 and about 150° C. at atmospheric or elevated pressures with high yields and good selectivity for the desired product. The preferred temperature is 50–100° C. at about atmospheric pressure. The reduced cobalt fluoride is regenerated with fluorine in accordance with Equation 2. The substitution reaction, as illustrated by Equation 3, is effected at a temperature between about 50 and about 200° C. at atmospheric pressure or higher in the presence of antimony pentafluoride with high yields and selectivity for the desired product. Other reaction conditions and other catalyst may be used for the substitution equation, depending upon the extent of substitution desired. Increased temperatures and longer contact times are employed to replace more than one chlorine atom per molecule. Equation 4, representing the removal of hydrogen and chlorine from trifluorodichloroethane is effected with a caustic solution of sodium, potassium, or calcium hydroxide at slightly elevated temperatures.

The process of this invention may be carried out in either a batchwise or continuous manner. The accompanying drawing diagrammatically illustrates an arrangement of apparatus for the continuous preparation of trifluorochloroethylene from trichloroethylene. The manner of operation and the specific reactants cited with regard to the drawing are illustrative and should not be construed as unnecessarily limiting to the present invention. According to the drawing, liquid or vaporous trichloroethylene is continuously passed through conduit 2 to a fluorination reaction zone 3 in which cobalt trifluoride, CoF₃, has been added through conduit 4. The trichloroethylene may be prepared from ethane by the chlorination of ethane to produce tetrachloroethane and the subsequent removal of hydrogen and chlorine with caustic to produce trichloroethylene. In reactor 3, trichloroethylene reacts with CoF₃ to produce trichlorodifluoroethane and CoF₂. The fluorination reaction may be carried out in the liquid or vapor phase. When operating in liquid phase, a temperature of 50–100° C. and about atmospheric pressure are usually employed. Reactor 3 may comprise a single or a plurality of reactors in parallel. When a single reactor is employed, the reduced cobalt fluoride, CoF₂, must be removed and replaced, or regenerated in situ. When a plurality of parallel reactors are employed, one reactor may be on stream while the other reactor is on regeneration in which the cobalt fluoride is refluorinated.

Trichlorodifluoroethane produced in reactor 3 is continuously passed to a second reactor 7 in which the paraffin is reacted with hydrogen fluoride in the presence of antimony pentachloride at about 100° C. and a slightly elevated pressure for liquid phase operations. Hydrogen fluoride is introduced into reactor 7 through conduit 8 and hydrogen chloride produced in reactor 7 is removed through conduit 9. As in the case of the fluorination reaction, the substitution reaction in reactor 7 may be carried out in the liquid or vapor phase without departing from the scope of this invention. Pressure and temperature conditions are correlated to obtain the desired phase conditions. In vapor phase operations, separation between the trifluorodichloroethane product of reactor 7 is more difficult than when operations are maintained in the liquid phase. Usually in vapor phase operations the product is condensed and separated from vaporous hydrogen chloride.

Vaporous or liquid trifluorodichloroethane is continuously passed from reactor 7 through conduct 11 to caustic treating unit 12. A caustic solution, such as an aqueous solution of sodium or potassium hydroxide, is introduced into unit 12 through conduit 13. The caustic dehydrochlorinates trifluorodichloroethane to trifluorochloroethylene. Spent caustic solution is removed from caustic treating unit 12 through conduit 14. The separation of caustic solution from trifluorochloroethylene is easily accomplished since, under the preferred conditions of slightly elevated temperatures and atmospheric pressure, trifluorochloroethylene is a vapor. Trifluorochloroethylene is removed as a vapor from unit 12 through conduit 16.

A portion of the effluent from each reaction zone may be recycled to the respective reaction zone to increase the overall yield and selectivity.

Trifluorochloroethylene may be converted to a solid polymer of good chemical and physical characteristics by polymerizing the monomer at a temperature of about −16° C. in the presence of bis-trichloroacetyl peroxide. The monomer may also be converted to oils by using different polymerization agents and different conditions of reaction. For a more complete discussion of the polymerization of the monomer, reference may be had to the application of William T. Miller, Serial No. 14,797, filed March 13, 1948, now U. S. Patent No. 2,579,437.

Although the invention has been described with reference to a specific flow and the use of specific types of apparatus, various modifications and alterations will become apparent to those skilled in the art. Various condensers, valves, separating and mixing zones, auxiliary equipment, etc. have been omitted from the drawing as a matter of convenience and clarity.

Having described our invention, we claim:

1. A process for the manufacture of a perhaloolefin containing at least three fluorine atoms from an olefin containing at least two chlorine atoms and one atom of hydrogen which comprises the steps of fluorinating such an olefin containing chlorine at a temperature between about 0° and about 150° in the presence of a catalyst to produce a product in which fluorine has been added and not substituted, reacting the said product with hydrogen fluoride at a temperature between about 50° and about 200° C. in the presence of a catalyst to produce a product in which a fluorine has been selectively substituted for a chlorine on a fully halogenated carbon atom, and subsequently dehydrochlorinating the product of the second step to produce the corresponding perhaloolefin as a product of the process.

2. A process for the manufacture of an olefin containing at least three fluorine atoms from an olefin containing at least two chlorine atoms and one atom of hydrogen which comprises reacting said olefin containing chlorine with cobalt trifluoride at a temperature between about 0 and about 150° C. to produce a compound of increased fluorine content by addition of fluorine and not by substitution, reacting the product thus produced with hydrogen fluoride in the presence of an antimony salt at a temperature between about 50 and about 200° C. to produce a product in which a fluorine has been selectively substituted for a chlorine on a fully halogenated carbon atom and contacting the product of the second step with a caustic solution to dehydrochlorinate and produce an olefin containing at least three fluorine atoms as a product of the process.

3. A process for the manufacture of trifluorochloroethylene from trichloroethylene which comprises reacting trichloroethylene with cobalt trifluoride at a temperature between about 0 and about 150° C. to produce difluorotrichloroethane by addition of fluorine and not by substitution, reacting difluorotrichloroethane with hydrogen fluoride in the presence of an antimony salt at a temperature between about 50 and about 200° C. to produce trifluorodichloroethane by selective substitution of a fluorine for a chlorine on a fully halogenated carbon atom and contacting trifluorodichloroethane with a caustic solution to produce trifluorochloroethylene as a product of the process.

4. A continuous process for the manufacture of trifluorochloroethylene which comprises introducing trichloroethylene into a first reaction zone in the presence of cobalt trifluoride at a temperature between about 0° C. and about 150° C. such that trichloroethylene is converted to difluorotrichloroethane by addition of fluorine and not by substitution and the cobalt trifluoride is reduced to cobalt difluoride, removing difluorotrichloroethane from said first reaction zone and continuously passing same to a second reaction zone, introducing hydrogen fluoride into said second reaction zone, maintaining a temperature between about 50° C. and about 200° in said second reaction zone such that difluorotrichloroethane reacts with hydrogen fluoride to produce trifluorodichloroethane by selective substitution of a fluorine for a chlorine on a fully halogenated carbon atom and hydrogen chloride, removing hydrogen chloride and trifluorodichloroethane from said second reaction zone, continuously passing trifluorodichloroethane to a third reaction zone, introducing a caustic solution into said third reaction zone, maintaining in said third reaction zone conditions of reaction such that trifluorodichloroethane is dehydrochlorinated to produce trifluorochloroethylene, and continuously removing trifluorochloroethylene from said third reaction zone as a product of the process.

5. The process of claim 4, in which the process is effected in the liquid phase.

6. The process of claim 4, in which the process is effected in the vapor phase.

7. A continuous process for the manufacture of trifluorochloroethylene which comprises continuously introducing trichloroethylene into a first reaction zone in the presence of cobalt trifluoride at a temperature between about 50 and about 100° C. under conditions such that trichloroethylene is converted to difluorotrichloroethane by addition of fluorine and not by substitution and the cobalt trifluoride is reduced to cobalt difluoride, regenerating the cobalt difluoride to the trifluoride for reuse in said first reaction zone, removing difluorotrichloroethane from said first reaction zone and continuously passing same to a second reaction zone, introducing hydrogen fluoride into said second reaction zone, maintaining a temperature between about 50 and about 200° C. in said second reaction zone such that difluorotrichloroethane reacts with hydrogen fluoride to produce trifluorodichloroethane by selective substitution of a fluorine for a chlorine on a fully halogenated carbon atom and hydrogen chloride, removing hydrogen chloride and trifluorodichloroethane from said second reaction zone, continuously passing trifluorodichloroethane to a third reaction zone, introducing a caustic solution of potassium hydroxide into said third reaction zone, maintaining in said third reaction zone conditions of reaction such that trifluorodichloroethane is dehydrochlorinated to produce trifluorochloroethylene, and continuously removing trifluorochloroethylene from said third reaction zone as a product of the process.

8. A process for the manufacture of an olefin containing at least three additional fluorine atoms from an olefin containing at least two chlorine atoms and at least one hydrogen atom which comprises the steps of fluorinating such an olefin containing chlorine in the liquid phase at a temperature between about 0° C. and about 150° C. to produce a compound containing two additional fluorine atoms by addition reaction, reacting the resulting fluorinated compound with hydrogen fluoride in the presence of a catalyst in the liquid phase at a temperature between about 50° C. and about 200° C. to produce a compound with one additional fluorine atom by selective substitution of a fluorine for a chlorine on a fully halogenated carbon atom, subsequently dehydrochlorinating the product of the aforesaid step in the liquid phase to produce the corresponding olefin, and subsequently recovering said corresponding olefin as a product of the process.

9. A process for the manufacture of fluorochloro-paraffins which comprises reacting a fluorochloro-paraffin containing at least 2 chlorine atoms and 1 hydrogen atom with hydrogen fluoride in the presence of a catalyst at a temperature between about 50° C. and about 200° C. to produce the corresponding fluorinated fluorochloro-paraffin in which a fluorine is selectively substituted for a chlorine on a fully halogenated carbon atom.

10. A process for the manufacture of dichlorotrifluoroethane ($CHFCl-CF_2Cl$) which comprises reacting trichlorodifluoroethane ($CHFCl-CFCl_2$) with hydrogen fluoride in the presence of an antimony salt as a catalyst at a temperature between about 50° C. and about 200° C. to produce trifluorodichloroethane ($CHFCl-CF_2Cl$) by the selective substitution of a fluorine for a chlorine on a fully halogenated carbon atom.

11. The process of claim 10, in which the process is effected in liquid phase and hydrogen chloride is removed overhead.

References Cited in the file of this patent
UNITED STATES PATENTS

| Number | Name | Date |
|---|---|---|
| 2,344,061 | Renoll | Mar. 14, 1944 |
| 2,426,172 | Beening | Aug. 26, 1947 |
| 2,493,007 | McBee et al. | Jan. 3, 1950 |
| 2,493,008 | McBee et al. | Jan. 3, 1950 |
| 2,566,807 | Padbury | Sept. 4, 1951 |

OTHER REFERENCES

Henne et al.: "Jour. Am. Chem. Soc.," vol. 58, pp. 402–3 (1936).